US012283234B2

(12) United States Patent
Wang et al.

(10) Patent No.: US 12,283,234 B2
(45) Date of Patent: Apr. 22, 2025

(54) PIXEL DRIVING CIRCUIT AND DRIVING METHOD THEREFOR, AND DISPLAY PANEL AND DISPLAY APPARATUS

(71) Applicant: BOE Technology Group Co., Ltd., Beijing (CN)

(72) Inventors: Can Wang, Beijing (CN); Yan Qu, Beijing (CN); Can Zhang, Beijing (CN); Minghua Xuan, Beijing (CN); Xiaochuan Chen, Beijing (CN); Ning Cong, Beijing (CN); Jinfei Niu, Beijing (CN); Jingjing Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/642,994

(22) Filed: Apr. 23, 2024

(65) Prior Publication Data

US 2024/0274069 A1 Aug. 15, 2024

Related U.S. Application Data

(63) Continuation of application No. PCT/CN2022/107495, filed on Jul. 22, 2022.

(51) Int. Cl.
*G09G 3/32* (2016.01)

(52) U.S. Cl.
CPC ....... *G09G 3/32* (2013.01); *G09G 2300/0842* (2013.01); *G09G 2310/027* (2013.01)

(58) Field of Classification Search
CPC ............. G09G 3/32; G09G 2300/0842; G09G 2310/027; G09G 3/3233
See application file for complete search history.

(56) References Cited

U.S. PATENT DOCUMENTS 10,395,589 B1 8/2019 Vahid Far et al.
2007/0018078 A1 1/2007 Miyazawa
(Continued)

FOREIGN PATENT DOCUMENTS

CN 1543637 A 11/2004
CN 110021264 A 7/2019
(Continued)

OTHER PUBLICATIONS

International Search Report and Written Opinion mailed on Apr. 18, 2023, in corresponding PCT/CN2022/107495, 13 pages.

*Primary Examiner* — Andrew Sasinowski
(74) *Attorney, Agent, or Firm* — XSENSUS LLP

(57) ABSTRACT

A pixel driving circuit including a driving circuit, a first light emission control circuit and a first digital circuit. The driving circuit is connected to a first power source end, a first node and the light-emitting unit, and is used for providing, according to the voltage of the first node, a driving current for the light-emitting unit by using the first power source end; the first light emission control circuit is connected to a first digital signal end; and the first digital circuit comprises a first signal conversion circuit, and the first signal conversion circuit is connected to a first analog signal end and the first digital signal end and is used for inputting the first digital signal into the first digital signal end according to a first analog signal of the first analog signal end.

20 Claims, 6 Drawing Sheets

(56) References Cited

U.S. PATENT DOCUMENTS

| | | | | |
|---|---|---|---|---|
| 2013/0278324 | A1* | 10/2013 | Kaneyasu | H03K 3/012 327/390 |
| 2017/0358254 | A1* | 12/2017 | Inoue | G09G 3/3648 |
| 2018/0114506 | A1* | 4/2018 | Takahashi | G06F 3/04166 |
| 2024/0249666 | A1* | 7/2024 | Muto | G09G 3/3233 |

FOREIGN PATENT DOCUMENTS

| | | | |
|---|---|---|---|
| CN | 110728946 | A | 1/2020 |
| CN | 110796985 | A | 2/2020 |
| CN | 111462679 | A | 7/2020 |
| CN | 111583857 | A | 8/2020 |
| CN | 112309305 | A | 2/2021 |
| CN | 113692612 | A | 11/2021 |
| CN | 114203103 | A | 3/2022 |
| CN | 114512087 | A | 5/2022 |

* cited by examiner

PIXEL DRIVING CIRCUIT AND DRIVING METHOD THEREFOR, AND DISPLAY PANEL AND DISPLAY APPARATUS

CROSS-REFERENCE TO RELATED APPLICATION

The present application is a continuation application of International Application No. PCT/CN2022/107495, filed on Jul. 22, 2022, and the entire contents thereof are incorporated herein by reference.

TECHNICAL FIELD

The present disclosure relates to the field of display technology, and in particular, to a pixel driving circuit and a driving method thereof, a display panel, and a display device.

BACKGROUND

In the related art, the pixel driving circuit generally provides driving current to the light-emitting unit according to the voltage of the data signal, that is, the pixel driving circuit controls the gray scale of the sub-pixel unit through the voltage of the data signal.

It should be noted that, information disclosed in the above background portion is provided only for better understanding of the background of the present disclosure, and thus it may contain information that does not form the prior art known by those ordinary skilled in the art.

SUMMARY

According to an aspect of the present disclosure, a pixel driving circuit is provided, wherein the pixel driving circuit is used to drive a light-emitting unit to emit light, and the pixel driving circuit includes: a driving circuit, a first light-emitting control circuit, and a first digital circuit, the driving circuit is connected to a first power terminal, a first node, and the light-emitting unit, and is configured to provide driving current to the light-emitting unit using the first power terminal according to a voltage of the first node; the first light-emitting control circuit is connected to a first digital signal terminal, is connected in series with the driving circuit between the first power terminal and the light-emitting unit, and is configured to turn on or off a current path between the first power terminal and the light-emitting unit in response to a first digital signal of the first digital signal terminal; and the first digital circuit includes a first signal conversion circuit, wherein the first signal conversion circuit is connected to a first analog signal terminal and the first digital signal terminal, and is configured to input the first digital signal to the first digital signal terminal according to a first analog signal of the first analog signal terminal.

According to an aspect of the present disclosure, a, driving method for the above pixel driving circuit is provided, and the method includes:

in a data writing stage, inputting a data signal to the first node; and in a light-emitting stage, inputting, by using the first signal conversion circuit, the first digital signal to the first digital signal terminal according to the first analog signal of the first analog signal terminal;

wherein, at at least partial gray scales, a duty cycle of an active level in the first digital signal is used to adjust a gray scale of a sub-pixel where the pixel driving circuit is located.

According to an aspect of the present disclosure, a display panel is provided, including the above pixel driving circuit.

According to an aspect of the present disclosure, a display device is provided, including the above display panel.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure. Obviously, the drawings in the following description are only some embodiments of the present disclosure. For those of ordinary skill in the art, other drawings can be obtained based on these drawings without exerting creative efforts.

DETAILED DESCRIPTION

Figure 1:
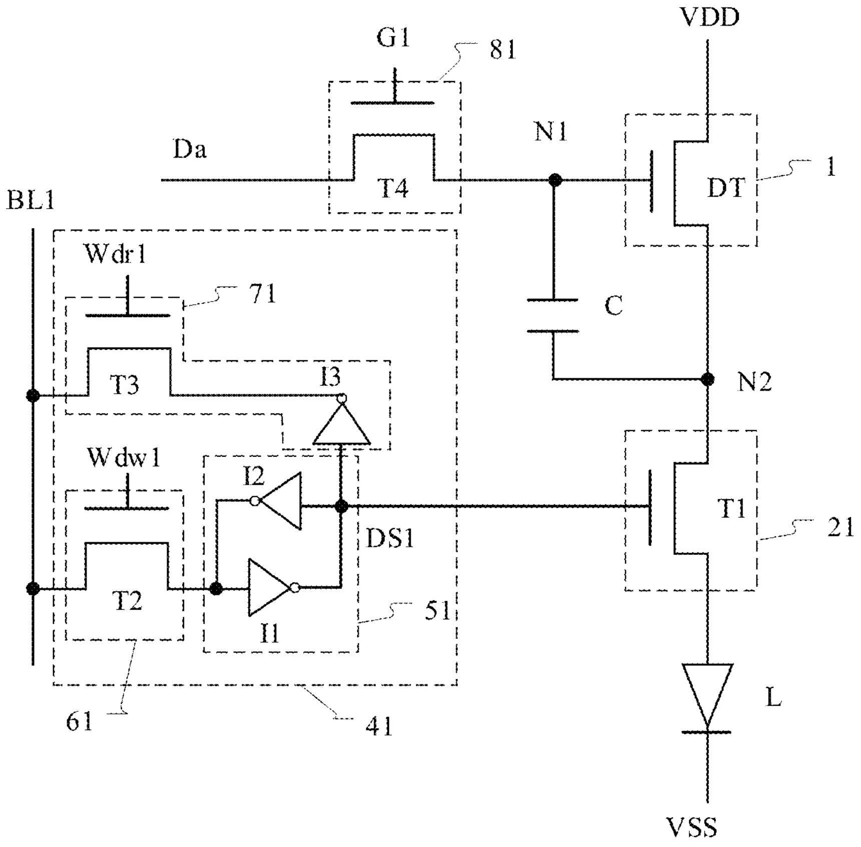
FIG. 1 is a schematic structural diagram of an exemplary embodiment of a pixel driving circuit of the present disclosure.

Example embodiments will now be described more fully with reference to the accompanying drawings. Example embodiments may, however, be embodied in various forms and should not be construed as limited to the examples set forth herein; rather, these embodiments are provided so that this disclosure will be thorough and complete and will fully convey the concepts of the example embodiments to those skilled in the art. The same reference numerals in the drawings indicate the same or similar structures, and thus their detailed descriptions will be omitted.

The terms “a”, “an” and “the” are used to indicate the existence of one or more elements/components/etc.; the terms “include” and “have” are used to indicate an open-ended inclusive meaning and indicate that there may be additional elements/components/etc. in addition to those listed.

This exemplary embodiment first provides a pixel driving circuit, as shown in FIG. 1, which is a schematic structural diagram of an exemplary embodiment of the pixel driving circuit of the present disclosure. Wherein, the pixel driving circuit is used to drive the light-emitting unit L to emit light. The pixel driving circuit may include: a driving circuit 1, a first light-emitting control circuit 21, and a first digital circuit 41. The driving circuit 1 is connected to the first power terminal VDD, the first node N1, and the light-emitting unit L, and is used to use the first power terminal VDD to provide a driving current to the light-emitting unit L according to the voltage of the first node N1. The other electrode of the light-emitting unit L can be connected to the second power terminal VSS; the first light-emitting control circuit 21 is connected to the first digital signal terminal DS1, is connected in series with the driving circuit 1 between the first power terminal VDD and the light-emitting unit L, and is used for to turn on or off the current path between the first power supply terminal VDD and the light-emitting unit L in response to the first digital signal of the first digital signal terminal DS1; the first digital circuit 41 includes a first signal conversion circuit 51, the first signal conversion circuit 51 is connected to the first analog signal terminal BL1 and the first digital signal terminal DS1, and is used to input the first digital signal to the first digital signal terminal DS1 according to the first analog signal of the first analog signal terminal BL1.

In this exemplary embodiment, in the data writing stage: a data signal can be input to the first node N1; in the light-emitting stage: the driving circuit 1 can use the first power terminal VDD to input a data signal to the light-emitting unit L according to the data signal of the first node N1. At the same time, a first analog signal can be input to the first analog signal terminal BL1. The first analog signal can include an active level and an inactive level that are alternately output. Correspondingly, the first digital signal can include an active level and an inactive level that are alternately output. When the first digital signal is at an active level, the first light-emitting control circuit 21 turns on the current path between the first power terminal VDD and the light-emitting unit L. When the first digital signal is at an inactive level, the first light-emitting control circuit 21 turns off the current path between the first power terminal VDD and the light-emitting unit L. The greater the duty cycle of the active level in the first digital signal, the greater the brightness of the light-emitting unit L. Correspondingly, the smaller the duty cycle of the active level in the first digital signal, the smaller the brightness of the light-emitting unit L. Thus, the pixel driving circuit can adjust the gray scale of the sub-pixel where the pixel driving circuit is located by controlling the duty cycle of the active level in the first digital signal.

It should be noted that the active level refers to the level that can drive the target circuit to turn on, and the inactive level refers to the level that can drive the target circuit to turn off. For example, when the target circuit is an N-type transistor, the active level is high level and the inactive level is low level.

In this exemplary embodiment, at high gray levels, the pixel driving circuit can control the gray level of the sub-pixel using only the data signal of the first node, and the duty cycle of the active level in the first digital signal can be 100%. At low gray levels, the gray level of the sub-pixel can be controlled only by using the duty cycle of the active level in the first digital signal, and the voltage of the first node N1 can remain unchanged in the low gray level range. This configuration can keep the output current of the driving circuit 1 at a higher value. Since the light-emitting unit L has higher luminous efficiency under a higher driving current, this configuration can improve the luminous efficiency of the light-emitting unit L and reduce power consumption of the pixel drive circuit. In a display panel with a maximum gray level of 255, the low gray level can be from 0 gray level to 40 gray level. For example, the low gray level can be 0 gray level, 20 gray level, and 40 gray level; the high gray level can be 41 gray level to 255 gray level, for example, the high gray level can be 41 gray level, 100 gray level, 150 gray level, 200 gray level, 255 gray level.

It should be understood that in other exemplary embodiments, the pixel driving circuit may also have other driving methods. For example, the pixel driving circuit may control the gray scale of the sub-pixel using both the data signal of the first node and the first digital signal at each gray level. By adjusting the duty cycle of the active level in the first digital signal, the gray scale corresponding to the original data signal can be further subdivided, so that the driving method can improve the control accuracy of the gray scale.

In this exemplary embodiment, the first digital circuit 41 can convert the first analog signal into a first digital signal. Both the logic 1 and the logic 0 of the first digital signal are stable potentials, so that this configuration can improve the stability of gray scale adjustment.

In this exemplary embodiment, as shown in FIG. 1, the first digital circuit 41 may further include: a first switch unit 61, and the first switch unit 61 is connected between the first signal conversion circuit 51 and the first analog signal terminal BL1, and is used to connect the first signal conversion circuit 51 and the first analog signal terminal BL1 in response to the signal of the first data writing signal terminal Wdw1.

In this exemplary embodiment, as shown in FIG. 1, the first digital circuit 41 may also include: a first detection circuit 71, the first detection circuit 71 is connected to the first digital signal terminal DS1, the first analog signal terminal BL1, and the first data reading signal terminal Wdr1; and is used to transmit the signal of the first digital signal terminal DS1 to the first analog signal terminal BL1 in response to the signal of the first data reading signal terminal Wdr1.

In this exemplary embodiment, as shown in FIG. 1, the first signal conversion circuit 51 may include: a first inverter I1 and a second inverter I2. The input end of the first inverter I1 is connected to the first analog signal terminal BL1, and the output end is connected to the first digital signal terminal DS1. The input end of the second inverter I2 is connected to the first digital signal terminal DS1 and the output end is connected to the input end of the first inverter I1. It should be understood that in other exemplary embodiments, the first signal conversion circuit 51 may also have other structures. For example, the first signal conversion circuit 51 may be an analog-to-digital converter. For another example, the first signal conversion circuit 51 may also include only the first inverter I1.

In this exemplary embodiment, as shown in FIG. 1, the driving circuit 1 may include: a driving transistor DT, the first electrode of the driving transistor DT is connected to the first power supply terminal VDD, the second electrode is connected to the second node N2, and the gate electrode is connected to the first node N1. The first light-emitting control circuit 21 includes: a first transistor T1, a first electrode of the first transistor T1 is connected to the second node N2, a second electrode is connected to the light-emitting unit L, and a gate electrode is connected to the first digital signal terminal DS1. It should be understood that the first light-emitting control circuit 21 can also be connected between the first power terminal VDD and the driving circuit 1.

In this exemplary embodiment, as shown in FIG. 1, the first switch unit 61 may include: a second transistor T2, the first electrode of the second transistor T2 is connected to the first analog signal terminal BL1, the second electrode of the second transistor T2 is connected to the first analog signal terminal BL1, and the gate electrode of the first signal conversion circuit 51 is connected to the first data writing signal terminal Wdw1.

In this exemplary embodiment, as shown in FIG. 1, the first detection circuit 71 is also used to invert the signal transmitted from the first digital signal terminal DS1 to the first analog signal terminal BL1. The first detection circuit 71 may include: a third inverter I3 and a third transistor T3. The input end of the third inverter I3 is connected to the first digital signal terminal DS1; the first electrode of the third transistor T3 is connected to the first analog signal terminal BL1, the second electrode is connected to the output end of the third inverter I3, and the gate electrode is connected to the first data reading signal terminal Wdr1.

In this exemplary embodiment, as shown in FIG. 1, the pixel driving circuit further includes: a first data writing circuit 81, which is connected to the first node N1, the data signal terminal Da, and the gate driving signal terminal G1, and is used to transmit the signal of the data signal terminal Da to the first node N1 in response to the signal of the first gate driving signal terminal G1. The first data writing circuit 81 may include: a fourth transistor T4, a first electrode of the fourth transistor T4 is connected to the data signal terminal Da, a second electrode is connected to the first node N1, and a gate electrode is connected to the first gate driving signal terminal G1.

In this exemplary embodiment, as shown in FIG. 1, the pixel driving circuit may further include a capacitor C, and the capacitor C is connected between the first node N1 and the second node N2.

In this exemplary embodiment, the driving transistor DT, the first transistor T1, the second transistor T2, the third transistor T3, and the fourth transistor T4 may be N-type transistors, the first power supply terminal VDD may be a high-level power supply terminal, and the second power supply terminal VSS can be a low-level power supply terminal. It should be understood that in other exemplary embodiments, the driving transistor DT, the first transistor T1, the second transistor T2, the third transistor T3, and the fourth transistor T4 may also be P-type transistors.

Figure 2:
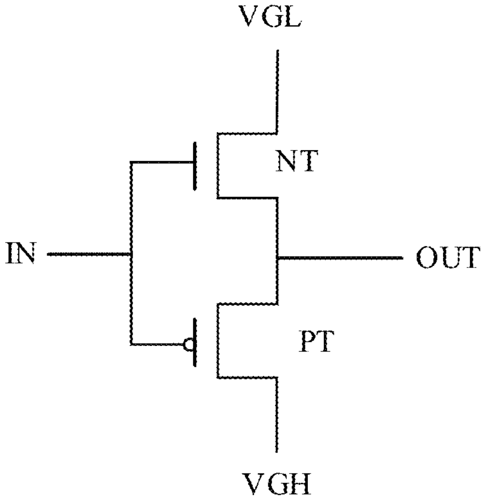
FIG. 2 is a schematic structural diagram of the inverter in FIG. 1.

As shown in FIG. 2, it is a schematic structural diagram of the inverter in FIG. 1. In this exemplary embodiment, each inverter may include an N-type transistor NT and a P-type transistor PT. The first electrode of the N-type transistor NT is connected to the low-level signal terminal VGL, the second electrode is connected to the output end OUT of the inverter, and the gate electrode is connected to the input end IN of the inverter; the first electrode of the P-type transistor PT is connected to the high-level signal terminal VGH, the second electrode is connected to the output end OUT of the inverter, and the gate electrode is connected to the input end IN of the inverter.

Figure 3:
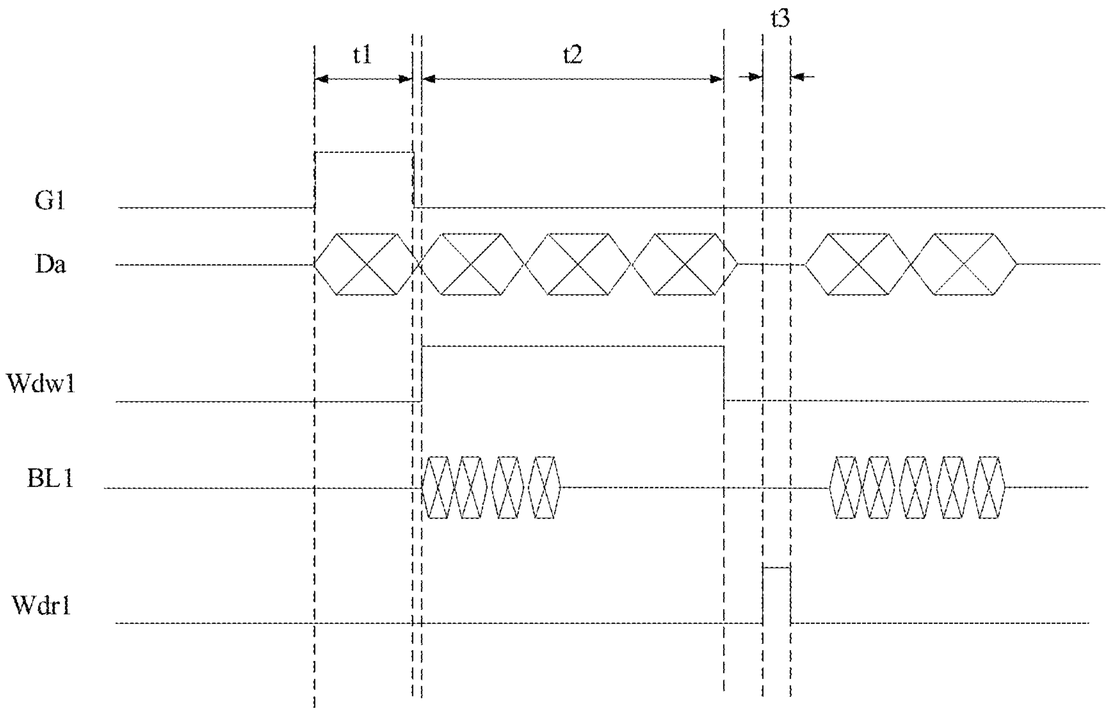
FIG. 3 is a timing diagram of each control signal in a driving method of the pixel driving circuit shown in FIG. 1.

As shown in FIG. 3, which is a timing diagram of each control signal in a driving method of the pixel driving circuit shown in FIG. 1. Wherein, G1 represents the timing diagram of the signal at the first gate driving signal terminal, Wdw1 represents the timing diagram of the signal at the first data writing signal terminal, BL1 represents the timing diagram of the signal at the first analog signal terminal, and Wdr1 represents the timing diagram of the first data at the first data reading signal terminal.

The pixel driving circuit driving method may include three stages: data writing stage t1, light-emitting stage t2, and detection stage t3. Wherein, during the data writing stage t1, the first gate driving signal terminal G1 outputs a high-level signal, the fourth transistor T4 is turned on, and the data signal terminal Da inputs a data signal to the first node N1. In the light-emitting stage t2, the data signal on the first node N1 drives the driving transistor DT to input a driving current to the second node N2. At the same time, the first data writing signal terminal Wdw1 outputs a high-level signal, the second transistor T2 is turned on, and the first analog signal terminal BL1 inputs a first analog signal to the first signal conversion circuit 51. The first analog signal includes alternately output high level and low level. When the first analog signal is high level, the first inverter I1 converts the first analog signal into a low level digital signal and transmits it to the first digital signal terminal DS1, and when the first analog signal is low level, the first inverter I1 converts the first analog signal into a high level digital signal and transmits it to the first digital signal terminal DS1. The second inverter I2 can invert the first digital signal at the first digital signal terminal DS1 and transmit it to the input end of the first inverter I1. The second inverter I2 and the first inverter I1 can form a latch structure, and the latch structure can improve the stability of the signal at the input end of the first inverter I1. The first digital signal on the first digital signal terminal DS1 can control the first transistor T1 to turn on or off, thereby controlling the gray scale of the sub-pixel. In the detection stage t3: the first data reading signal terminal Wdr1 outputs a high level, the third transistor T3 is turned on, and the third inverter I3 inverts the signal of the first digital signal terminal DS1 and transmits it to the first analog signal terminal BL1, so that the voltage on the first analog signal terminal BL1 can be detected through an external detection circuit to detect whether the logic signal on the first digital signal terminal DS1 is correct.

In this exemplary embodiment, the detection stage t3 may be in a blank stage between frames. As shown in FIG. 3, during the light-emitting stage t2, the first data writing signal terminal Wdw1 can continuously output a high-level signal. It should be understood that in other exemplary embodiments, the detection stage t3 may also be in other time periods. In addition, in other exemplary embodiments, during the light-emitting stage t2, the first data writing signal terminal Wdw1 can also output multiple high-level pulse signals. The high-level pulse signals output by the first data writing signal terminal Wdw1 and the low-level pulse signal output by the first analog signal terminal BL1 correspond to one-to-one, and the high-level pulse signal output by the first data writing signal terminal Wdw1 and the corresponding low-level pulse signal output by the first analog signal terminal BL1 at least partially overlap in the output period.

As shown in FIG. 1, when the data signal voltage that the data signal terminal Da needs to write to the first node N1 is relatively large, the gate-source voltage difference of the fourth transistor T4 is small, wherein the gate-source voltage difference of the fourth transistor T4 is equal to the voltage difference between the first gate driving signal terminal G1 and the first node N1. A small gate-source voltage difference may fail to turn on the fourth transistor T4. That is, the data signal terminal Da cannot write the required data signal voltage to the first node N1.

Figure 4:
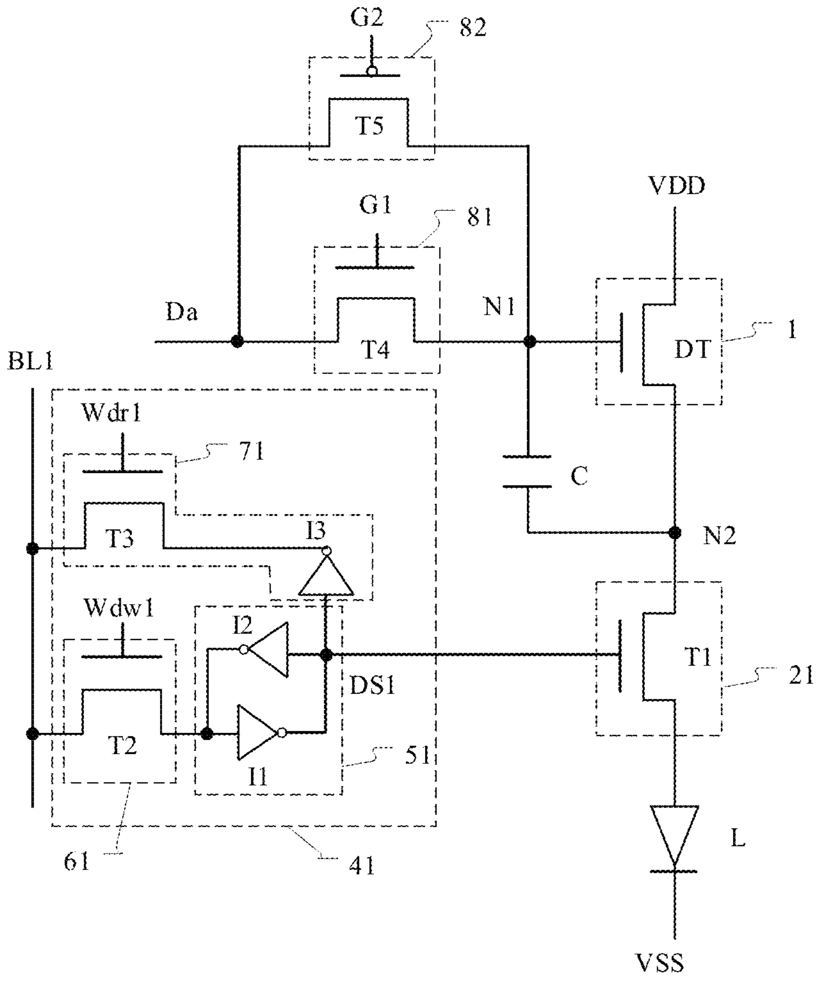
FIG. 4 is a schematic structural diagram of another exemplary embodiment of the pixel driving circuit of the present disclosure.

Based on this, as shown in FIG. 4, which is a schematic structural diagram of another exemplary embodiment of a pixel driving circuit of the present disclosure. In this exemplary embodiment, the pixel driving circuit may further include: a second data writing circuit 82. The second data writing circuit 82 is connected to the first node N1, the data signal terminal Da, and the second gate driving signal terminal G2, and is used to transmit the signal of the data signal terminal Da to the first node N1 in response to the signal of the second gate driving signal terminal G2. The on-level polarity of the first data writing circuit 81 and the on-level polarity of the second data writing circuit 82 are reversed. The second data writing circuit 82 may include: a fifth transistor T5, a first electrode of the fifth transistor T5 is connected to the data signal terminal Da, a second electrode is connected to the first node N1, and a gate electrode is connected to the second gate driving signal terminal G2. The fifth transistor T5 may be a P-type transistor. When the voltage of the data signal needed to be written to the first node N1 by the data signal terminal Da is relatively large, the fifth transistor T5 can be turned on through the second gate driving signal terminal G2. Since the fifth transistor T5 is a P-type transistor, the fifth transistor T5 can be turned on more fully as smaller the gate-source voltage difference of the transistor T5 is. In the embodiment, the gate-source voltage difference of the fifth transistor T5 is equal to the voltage difference between the second gate driving signal terminal G2 and the data signal terminal Da. Therefore, the data signal terminal Da can input a larger voltage to the first node N1 through the fifth transistor T5. That is, this configuration increases the setting range of the data signal voltage.

In this exemplary embodiment, during the data writing stage, the fourth transistor T4 and the fifth transistor T5 may be turned on at the same time. It should be understood that in other exemplary embodiments, the fifth transistor T5 may be turned on when the data signal voltage is relatively high, and the fourth transistor may be turned on when the data signal voltage is relatively small. Furthermore, in other exemplary embodiments, the fourth transistor T4 may be a P-type transistor, and the fifth transistor T5 may be an N-type transistor.

In this exemplary embodiment, in order to prevent the light-emitting unit L from flickering, the first analog signal terminal BL1 needs to output a relatively high frequency low-level pulse signal. However, being limited by the driving capability of the circuit that provides the first analog signal to the first analog signal terminal BL1, the pulse duration of the low-level pulse signal output by the first analog signal terminal BL1 in the high-frequency output state will not be too small. As a result, the high-level duty cycle on the first digital signal terminal DS1 cannot be too small, that is, the adjustment range of the high-level duty cycle on the first digital signal terminal DS1 is limited.

Figure 5:
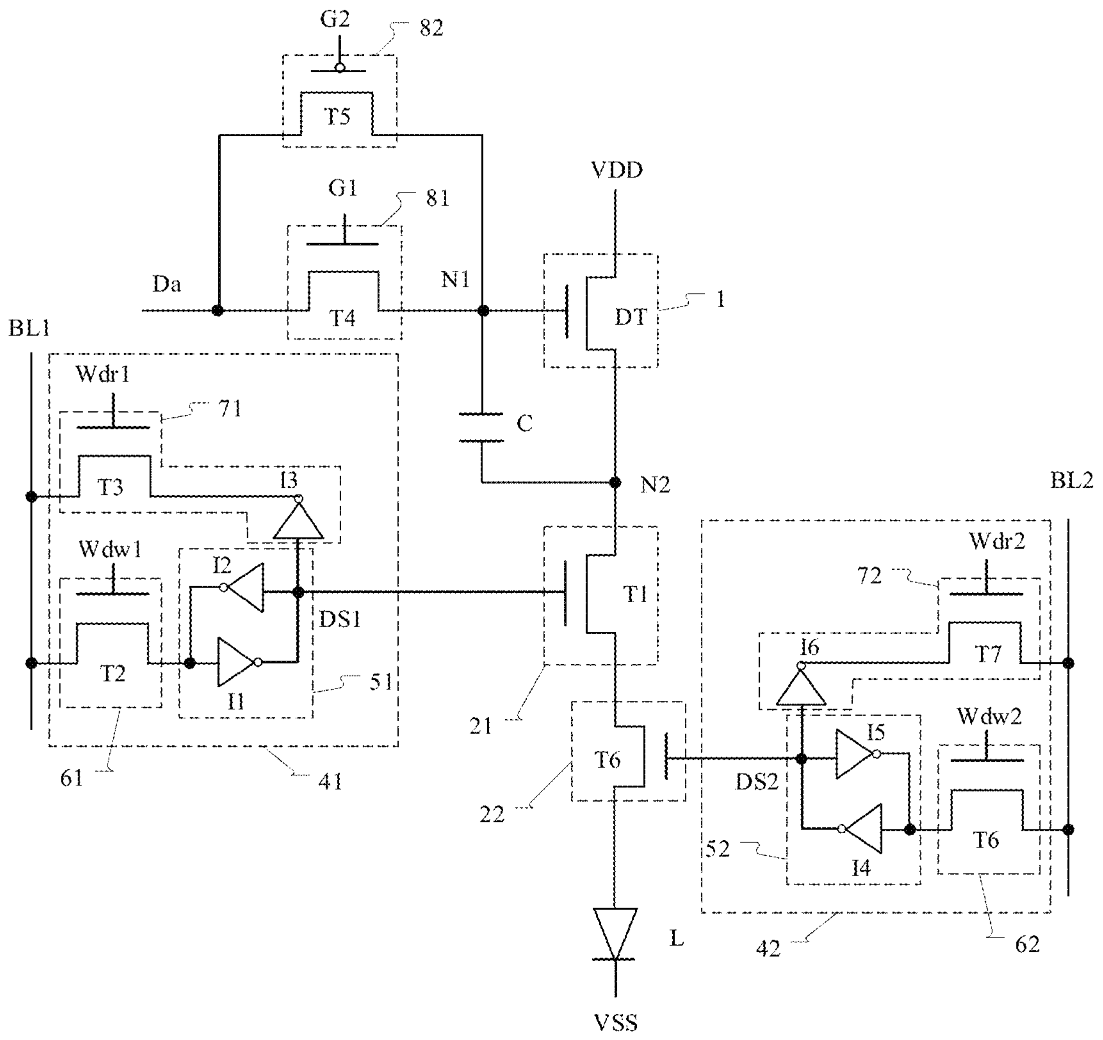
FIG. 5 is a schematic structural diagram of another exemplary embodiment of the pixel driving circuit of the present disclosure.

Based on this, as shown in FIG. 5, it is a schematic structural diagram of another exemplary embodiment of a pixel driving circuit of the present disclosure. In this exemplary embodiment, the pixel driving circuit may further include: a second light-emitting control circuit 22 and a second digital circuit 42. The second light-emitting control circuit 22 is connected to the second digital signal terminal DS2 and is connected to the driving circuit 1 in series between the first power terminal VDD and the light-emitting unit L, and is used to turn on or turn off the current path between the first power terminal VDD and the light-emitting unit L in response to the second digital signal of the second digital signal terminal DS2. The second digital circuit 42 includes a second signal conversion circuit 52, the second signal conversion circuit 52 is connected to the second analog signal terminal BL2 and the second digital signal terminal DS2, and is used to input the second digital signal to the second digital signal terminal DS2 according to the second analog signal of the second analog signal terminal BL2.

In this exemplary embodiment, as shown in FIG. 5, the second digital circuit 42 further includes: a second switch unit 62 and a second detection circuit 72. The second switch unit 62 is connected between the second signal conversion circuit 52 and the second analog signal terminal BL2, and used to connect the second signal conversion circuit 52 and the second analog signal terminal BL2 in response to the signal of the second data writing signal terminal Wdw2. The second detection circuit 72 is connected to the second digital signal terminal DS2, the second analog signal terminal BL2, and the second data read signal terminal Wdr2, and is used to transmit the signal of the second digital signal terminal DS2 to the second analog signal terminal BL2 in response to the signal of the second data read signal terminal Wdr2.

In this exemplary embodiment, as shown in FIG. 5, the second signal conversion circuit 52 may include: a fourth inverter I4 and a fifth inverter I5. The input end of the fourth inverter I4 is connected to the second analog signal terminal BL2, the output end is connected to the second digital signal terminal DS2. The input end of the fifth inverter I5 is connected to the second digital signal terminal DS2, and the output end is connected to the input end of the fourth inverter I4. The second light-emitting control circuit 22 may include: a sixth transistor T6, a first electrode of the sixth transistor T6 is connected to the first light-emitting control circuit 21, a second electrode is connected to the light-emitting unit L, and a gate electrode is connected to the second digital signal terminals DS2. The second detection circuit 72 is also used to invert the signal transmitted from the second digital signal terminal DS2 to the second analog signal terminal BL2. The second detection circuit 72 may include: a inverter 16 and a seventh transistor T7, the input end of sixth inverter 16 is connected to the second digital signal terminal DS2; the first electrode of the seventh transistor T7 is connected to the second analog signal terminal BL2, the second electrode is connected to the second output end of the sixth inverter 16, and the gate electrode is connected to the second data read signal terminal Wdr2.

Figure 6:
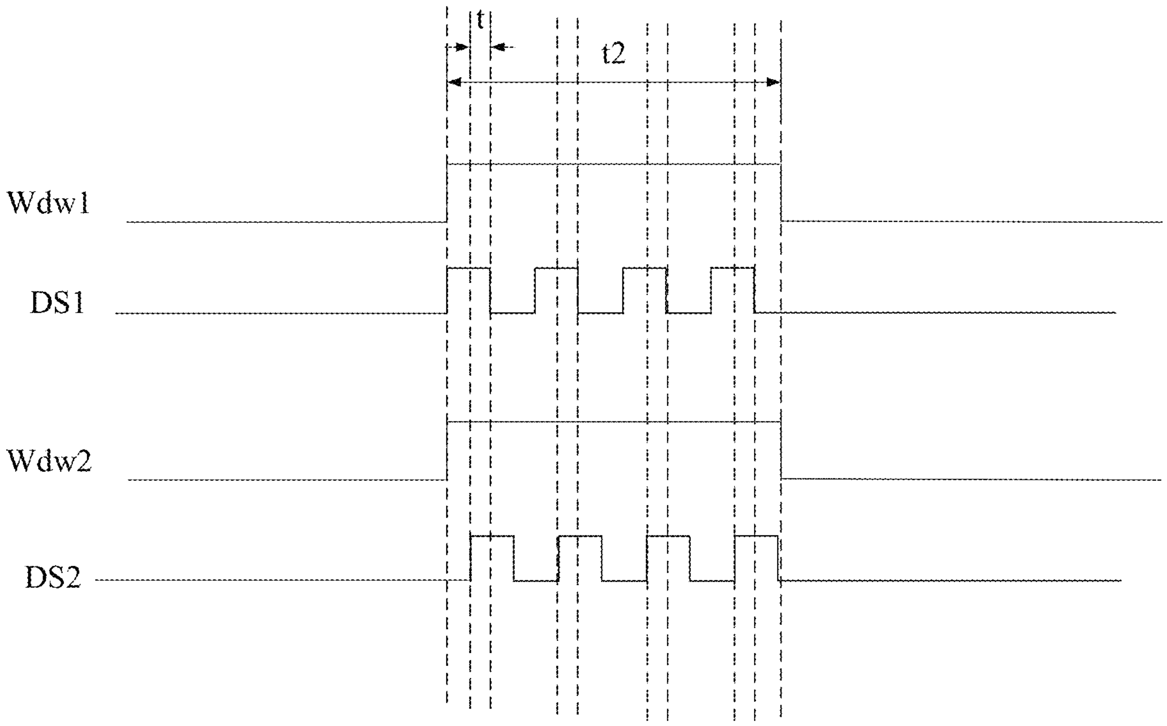
FIG. 6 is a timing diagram of some control signals in a driving method of the pixel driving circuit shown in FIG. 5.

As shown in FIG. 6, which is a timing diagram of some control signals in a driving method of the pixel driving circuit shown in FIG. 5, where Wdw1 represents the timing diagram of the signal at the first data writing signal terminal, Wdw2 represents the timing diagram of the signal at the second data writing signal terminal, DS1 represents the timing of the signal at the first digital signal terminal, and DS2 represents the timing of the signal at the second digital signal terminal.

In the light-emitting stage t2, the first analog signal on the first analog signal terminal BL1 and the second analog signal on the second analog signal terminal BL2 may have different timings, so that the first digital signal on the first digital signal terminal DS1 and the second digital signal on the second digital signal terminal DS2 have different timings. The high-level period of the first digital signal and the high-level period of the second digital signal may partially overlap. As shown in FIG. 6, during the high-level overlapped period t of the first digital signal and the second digital signal, the first transistor T1 and the sixth transistor T6 are turned on simultaneously, and the light-emitting unit L emits light. It can be seen from FIG. 6 that when the light-emitting frequency of the light-emitting unit L remains unchanged, the pixel driving circuit shown in FIG. 6 can achieve a shorter single light-emitting time of the light-emitting unit L, thereby achieving smaller gray scale adjustment.

Figure 7:
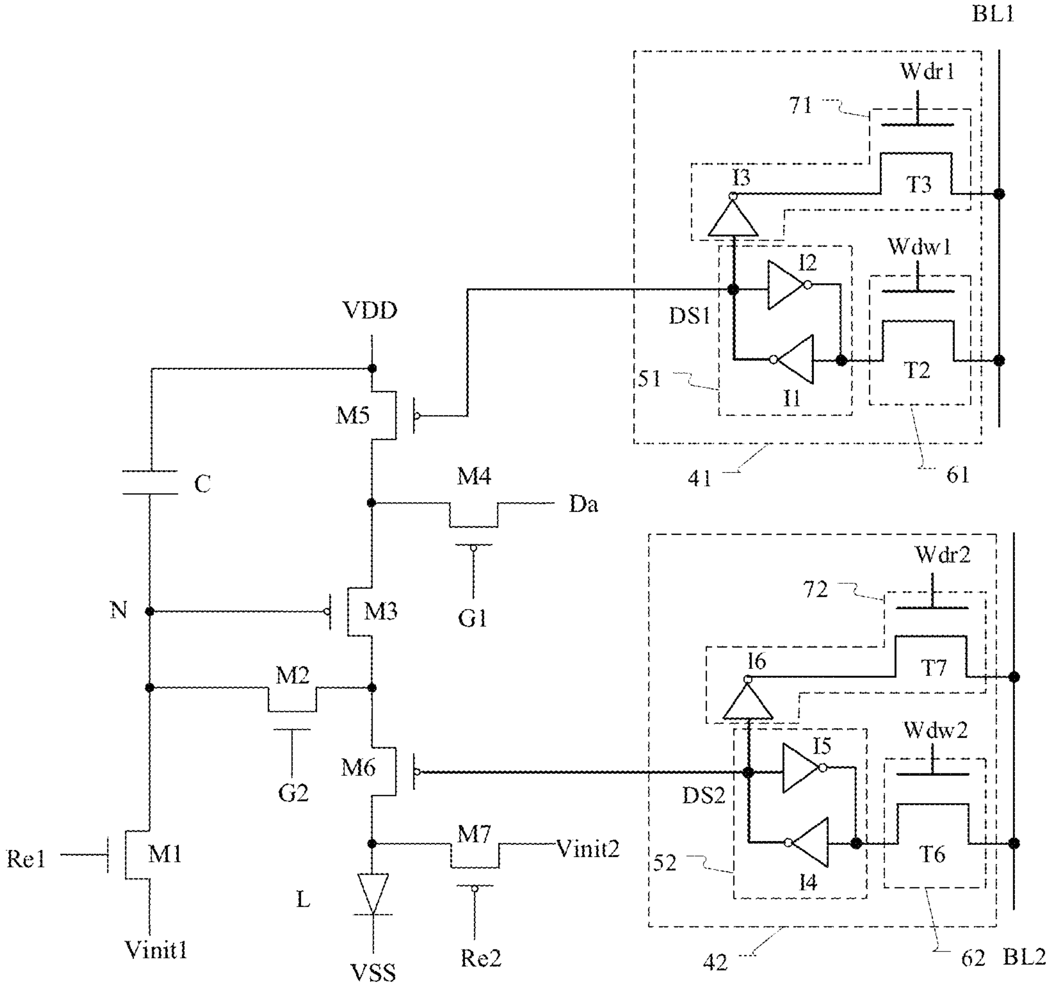
FIG. 7 is a schematic structural diagram of another exemplary embodiment of a pixel driving circuit of the present disclosure.

In this exemplary embodiment, as shown in FIG. 1, the first digital circuit 41 is incorporated into in the pixel driving circuit architecture of 3T1C; as shown in FIG. 5, the first digital circuit 41 and the second digital circuit 42 are incorporated into in the pixel driving circuit architecture of 5T1C. It should be understood that in other exemplary embodiments, the first digital circuit 41 and/or the second digital circuit 42 may also be incorporated into pixel driving circuits of other architectures. For example, as shown in FIG. 7, it is a schematic structural diagram of another exemplary embodiment of a pixel driving circuit of the present disclosure. The first digital circuit 41 and the second digital circuit 42 may be integrated into the pixel driving circuit architecture of 7T1C. In addition to the first digital circuit 41 and the second digital circuit 42, the pixel driving circuit may also include: a driving transistor M3, a first transistor M1, a second transistor M2, a fourth transistor M4, a fifth transistor M5, a sixth transistor M6, a seventh transistor M7, and capacitor C. Wherein, the first electrode of the fourth transistor M4 is connected to the data signal terminal Da, the second electrode of the fourth transistor M4 is connected to the first electrode of the driving transistor M3, and the gate electrode of the fourth transistor M4 is connected to the first gate driving signal terminal G1. The first electrode of the fifth transistor M5 is connected to the first power terminal VDD, the second electrode of the fifth transistor M5 is connected to the first electrode of the driving transistor M3, and the gate electrode of the fifth transistor M5 is connected to the first digital signal terminal DS1. The gate electrode of the driving transistor M3 is connected to the node N. The first electrode of the second transistor M2 is connected to the node N, the second electrode of the second transistor M2 is connected to the second electrode of the driving transistor M3, and the gate electrode of the second transistor M2 is connected to the second gate driving signal. terminal G2. The first electrode of the sixth transistor M6 is connected to the second electrode of the driving transistor M3, the second electrode of the sixth transistor M6 is connected to the second electrode of the seventh transistor M7, and the gate electrode of the sixth transistor M6 is connected to the second digital signal terminal DS2. The first electrode of the seventh transistor M7 is connected to the second initial signal terminal ViniM2, and the gate electrode of the seventh transistor M7 is connected to the second reset signal terminal Re2. The second electrode of the first transistor M1 is connected to the node N, and the first electrode of the first transistor M1 is connected to the first initial signal terminal ViniM1, and the gate electrode of the first transistor M1 is connected to the first reset signal terminal Re1. The first electrode of the capacitor C is connected to the node N, and the second electrode of the capacitor C is connected to the first power terminal VDD. The pixel driving circuit can be connected to a light-emitting unit L. The pixel driving circuit is used to drive the light-emitting unit L to emit light. The first electrode of the light-emitting unit L can be connected to the second electrode of the sixth transistor M6, and the second electrode of the light-emitting unit can be connected to the second power terminal VSS. The first transistor M1 and the second transistor M2 may be N-type transistors, and the driving transistor M3, the fourth transistor M4, the fifth transistor M5, the sixth transistor M6, and the seventh transistor M7 may be P-type transistors.

In this exemplary embodiment, the light-emitting unit L may be a micro light-emitting diode (Micro LED), a mini light-emitting diode (Mini LED), etc. The size of the mini light-emitting diode is approximately 100-300 μm; the size of micro light-emitting diodes is below 100 μm. The pixel driving circuit may be a CMOS pixel driving circuit integrated on a silicon base. That is, the backplane in the display panel may include silicon elements, such as polysilicon or monocrystalline silicon, and the backplane may be referred to as a silicon substrate or a silicon-based backplane. The transistors in the pixel drive circuit are formed in the silicon substrate through a CMOS process. In some embodiments, the silicon-based transistor formed in the silicon substrate includes a silicon substrate. Compared with the glass-based thin film transistor, the silicon-based transistor may have the following advantages: 1. the size of the silicon-based transistor is tens to hundreds of nanometers, the size of glass-based thin film transistors is several microns to tens of microns, and the size of silicon-based transistors is small; 2. the conduction time of silicon-based transistors is tens of picoseconds, the conduction time of glass-based thin film transistors is between tens to hundreds of nanoseconds (nanoseconds), and the conduction time of silicon-based transistors is faster; and 3. the stability of silicon-based transistors is higher than that of transistors prepared on glass substrates. The pixel driving circuit composed of glass-based transistors does not need to compensate for the threshold voltage. It should be understood that in other exemplary embodiments, the light-emitting unit may also be other types of light-emitting diodes.

This exemplary embodiment also provides a pixel driving circuit driving method, wherein the driving method is used to drive the above-mentioned pixel driving circuit, and the driving method includes:

in the data writing stage, inputting a data signal to the first node; and in the light-emitting stage, inputting the first digital signal, by the first signal conversion circuit, to the first digital signal terminal according to the first analog signal of the first analog signal terminal;

wherein, in at least part of the gray scales, the duty cycle of the active level in the first digital signal is used to adjust the gray scale of the sub-pixel where the pixel driving circuit is located.

In this exemplary embodiment, the driving method includes:

at high gray levels, adjusting the gray level of the sub-pixel where the pixel driving circuit is located using the voltage of the first node; and at low gray levels, adjusting the gray level of the sub-pixel where the pixel driving circuit is located using the duty cycle of the active level in the first digital signal.

In this exemplary embodiment, when the first digital circuit includes the first detection circuit, the driving method further includes:

in the detection stage, transmitting the signal of the first digital signal terminal to the first analog signal terminal using the first detection circuit.

In this exemplary embodiment, when the pixel driving circuit includes a second light-emitting control circuit and a second digital circuit, the driving method further includes:

at at least partial gray scale, adjusting the gray scale of the sub-pixel where the pixel driving circuit is located using the duty cycle of the overlap period of the active level in the first digital signal and the active level in the second digital signal.

This exemplary embodiment also provides a display panel, wherein the display panel may include the above-mentioned pixel driving circuit.

This exemplary embodiment also provides a display device, wherein the display device includes the above-mentioned display panel. The display device can be a display device such as VR (virtual reality), AR (augmented reality), mobile phone, tablet computer, etc.

Other embodiments of the disclosure will be readily apparent to those skilled in the art from consideration of the specification and practice of the disclosure herein. This application is intended to cover any variations, uses, or adaptations of the disclosure that follow the general principles of the disclosure and include common knowledge or customary techniques in the technical fields not disclosed by the disclosure means. It is intended that the specification and examples be considered as exemplary only, with a true scope and spirit of the disclosure being indicated by the following claims.

It is to be understood that the present disclosure is not limited to the precise structures described above and illustrated in the accompanying drawings, and various modifications and changes may be made without departing from the scope thereof. The scope of the disclosure is limited only by the appended claims.

What is claimed is:

1. A pixel driving circuit, wherein the pixel driving circuit is used to drive a light-emitting unit to emit light, and the pixel driving circuit comprises:

a driving circuit, connected to a first power terminal, a first node, and the light-emitting unit, and configured to provide driving current to the light-emitting unit using the first power terminal according to a voltage of the first node;

a first light-emitting control circuit, connected to a first digital signal terminal, connected in series with the driving circuit between the first power terminal and the light-emitting unit, and configured to turn on or off a current path between the first power terminal and the light-emitting unit in response to a first digital signal of the first digital signal terminal; and a first digital circuit, comprising a first signal conversion circuit, wherein the first signal conversion circuit is connected to a first analog signal terminal and the first digital signal terminal, and is configured to input the first digital signal to the first digital signal terminal according to a first analog signal of the first analog signal terminal.

2. The pixel driving circuit according to claim 1, wherein the first digital circuit further comprises:

a first switch unit, connected between the first signal conversion circuit and the first analog signal terminal, and configured to connect the first signal conversion circuit and the first analog signal terminal in response to a signal of a first data writing signal terminal.

3. The pixel driving circuit according to claim 1, wherein the first digital circuit further comprises:

a first detection circuit, connected to the first digital signal terminal, the first analog signal terminal, and a first data reading signal terminal, and configured to transmit a signal of the first digital signal terminal to the first analog signal terminal in response to a signal of the first data reading signal terminal.

4. The pixel driving circuit according to claim 1, wherein the first signal conversion circuit comprises:

a first inverter, having an input end connected to the first analog signal terminal, and an output end connected to the first digital signal terminal; and a second inverter, having an input end connected to the first digital signal terminal and an output end connected to the input end of the first inverter.

5. The pixel driving circuit according to claim 1, wherein the driving circuit comprises:

a driving transistor, having a first electrode connected to the first power terminal, a second electrode connected to a second node, and a gate electrode connected to the first node; and the first light-emitting control circuit comprises:

a first transistor, having a first electrode connected to the second node, a second electrode connected to the light-emitting unit, and a gate electrode connected to the first digital signal terminal.

6. The pixel driving circuit according to claim 2, wherein the first switch unit comprises:

a second transistor, having a first electrode connected to the first analog signal terminal, a second electrode connected to the first signal conversion circuit, and a gate electrode connected to the first data writing signal terminal.

7. The pixel driving circuit according to claim 3, wherein the first signal conversion circuit comprises:

a first inverter, having an input end connected to the first analog signal terminal, and an output end connected to the first digital signal terminal; and the first detection circuit is further configured to invert the signal transmitted from the first digital signal terminal to the first analog signal terminal.

8. The pixel driving circuit according to claim 7, wherein the first detection circuit comprises:

a third inverter, having an input end connected to the first digital signal terminal; and a third transistor, having a first electrode connected to the first analog signal terminal, a second electrode connected to an output end of the third inverter, and a gate electrode connected to the first data reading signal terminal.

9. The pixel driving circuit according to claim 1, wherein the pixel driving circuit further comprises:

a first data writing circuit, connected to the first node, a data signal terminal and a first gate driving signal terminal, and configured to transmit a signal of the data signal terminal to the first node in response to a signal of the first gate driving signal terminal.

10. The pixel driving circuit according to claim 9, wherein the pixel driving circuit further comprises:

a second data writing circuit, connected to the first node, the data signal terminal and a second gate driving signal terminal, and configured to transmit the signal of the data signal terminal to the first node in response to a signal of the second gate driving signal terminal; and a level polarity for turning on the first data writing circuit is opposite to a level polarity for turning on the second data writing circuit.

11. The pixel driving circuit according to claim 10, wherein the first data writing circuit comprises:

a fourth transistor, having a first electrode connected to the data signal terminal, a second electrode connected to the first node, and a gate electrode connected to the first gate driving signal terminal; and the second data writing circuit comprises:

a fifth transistor, having a first electrode connected to the data signal terminal, a second electrode connected to the first node, and a gate electrode connected to the second gate driving signal terminal; and among the fourth transistor and the fifth transistor, one transistor is an N-type transistor, and the other transistor is a P-type transistor.

12. The pixel driving circuit according to claim 1, wherein the pixel driving circuit further comprises:

a second light-emitting control circuit, connected to a second digital signal terminal, connected in series with the driving circuit between the first power supply terminal and the light-emitting unit, and configured to turn on or off the current path between the first power terminal and the light-emitting unit in response to a second digital signal of the second digital signal terminal; and a second digital circuit, comprising a second signal conversion circuit, wherein the second signal conversion circuit is connected to a second analog signal terminal and the second digital signal terminal, and is configured to input the second digital signal to the second digital signal terminal according to a second analog signal of the second analog signal terminal.

13. The pixel driving circuit according to claim 12, wherein the second digital circuit further comprises:

a second switch unit, connected between the second signal conversion circuit and the second analog signal terminal, and configured to connect the second signal conversion circuit and the second analog signal terminal in response to a signal of the second data writing signal terminal; and a second detection circuit, connected to the second digital signal terminal, the second analog signal terminal, and a second data reading signal terminal, and configured to transmit a signal of the second digital signal terminal to the second analog signal terminal in response to a signal of the second data reading signal terminal.

14. The pixel driving circuit according to claim 13, wherein the second signal conversion circuit comprises:

a fourth inverter, having an input end connected to the second analog signal terminal and an output end connected to the second digital signal terminal; and a fifth inverter, having an input end connected to the second digital signal terminal and an output end connected to the input end of the fourth inverter;

the second light-emitting control circuit comprises:

a sixth transistor, having a first electrode connected to the first light-emitting control circuit, a second electrode connected to the light-emitting unit, and a gate electrode connected to the second digital signal terminal; and the second detection circuit is further configured to invert the signal transmitted from the second digital signal terminal to the second analog signal terminal; and the second detection circuit comprises:

a sixth inverter, having an input end connected to the second digital signal terminal; and a seventh transistor, having a first electrode connected to the second analog signal terminal, a second electrode connected to an output end of the sixth inverter, and a gate electrode connected to the second data reading signal terminal.

15. A driving method for the pixel driving circuit according to claim 1, and the method comprises:

in a data writing stage, inputting a data signal to the first node; and in a light-emitting stage, inputting, by using the first signal conversion circuit, the first digital signal to the first digital signal terminal according to the first analog signal of the first analog signal terminal;

wherein, at at least partial gray scales, a duty cycle of an active level in the first digital signal is used to adjust a gray scale of a sub-pixel where the pixel driving circuit is located.

16. The driving method for the pixel driving circuit according to claim 15, wherein the driving method comprises:

at high gray levels, adjusting the gray level of the sub-pixel where the pixel driving circuit is located using a voltage of the first node; and at low gray levels, adjusting the gray level of the sub-pixel where the pixel driving circuit is located using the duty cycle of the active level in the first digital signal.

17. The driving method for the pixel driving circuit according to claim 15, wherein when the first digital circuit further comprises the first detection circuit, the driving method further comprises:

in a detection stage, transmitting the signal of the first digital signal terminal to the first analog signal terminal using the first detection circuit.

18. The driving method for the pixel driving circuit according to claim 15, wherein when the pixel driving circuit comprises the second light-emitting control circuit and the second digital circuit, the driving method further comprises:

at at least partial gray scales, adjusting the gray scale of the sub-pixel where the pixel driving circuit is located using the duty cycle of an overlap period of the active level in the first digital signal and the active level in the second digital signal.

19. A display panel, comprising the pixel driving circuit according to claim 1.

20. A display device, comprising a display panel having a pixel driving circuit used to drive a light-emitting unit to emit light, and the pixel driving circuit comprises:

a driving circuit, connected to a first power terminal, a first node, and the light-emitting unit, and configured to provide driving current to the light-emitting unit using the first power terminal according to a voltage of the first node;

a first light-emitting control circuit, connected to a first digital signal terminal, connected in series with the driving circuit between the first power terminal and the light-emitting unit, and configured to turn on or off a current path between the first power terminal and the light-emitting unit in response to a first digital signal of the first digital signal terminal; and a first digital circuit, comprising a first signal conversion circuit, wherein the first signal conversion circuit is connected to a first analog signal terminal and the first digital signal terminal, and is configured to input the first digital signal to the first digital signal terminal according to a first analog signal of the first analog signal terminal.

* * * * *